Jan. 24, 1967    K. HORA    3,299,830
BAR-COUPLING
Filed May 7, 1965    2 Sheets-Sheet 1
FIG. 1
FIG. 2
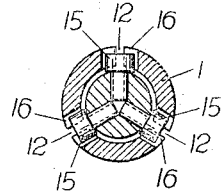
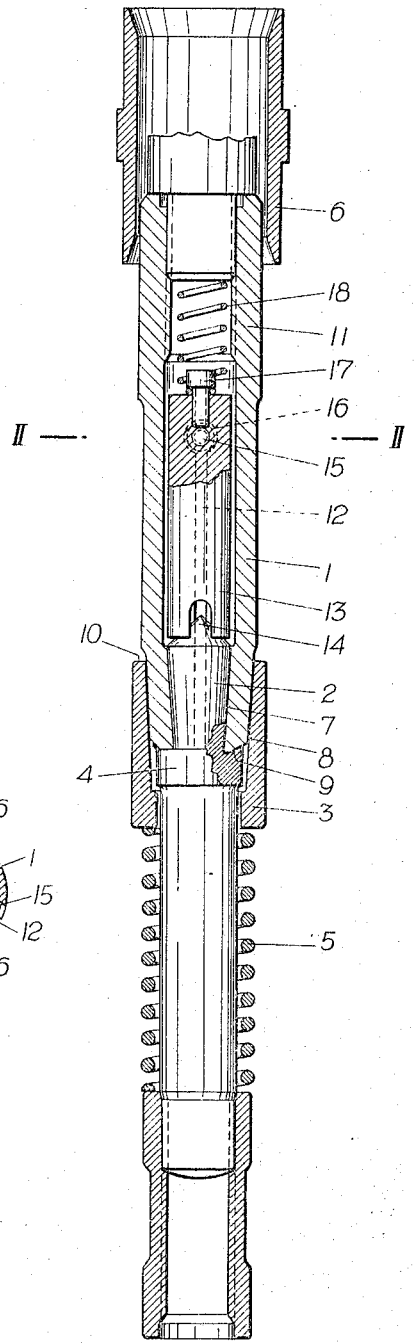
Inventor
Karl Hora
By Everest, Montague
Attorney Jan. 24, 1967  K. HORA  3,299,830
BAR-COUPLING
Filed May 7, 1965  2 Sheets-Sheet 2
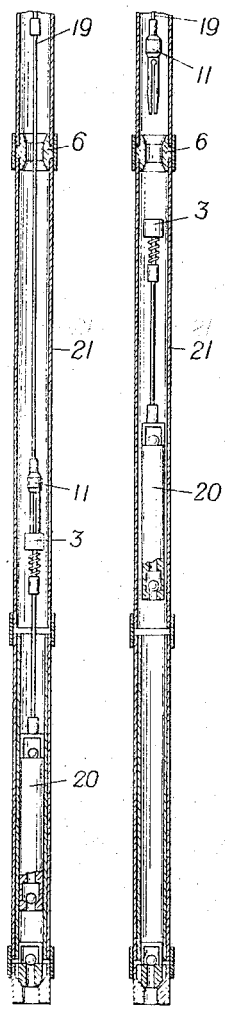
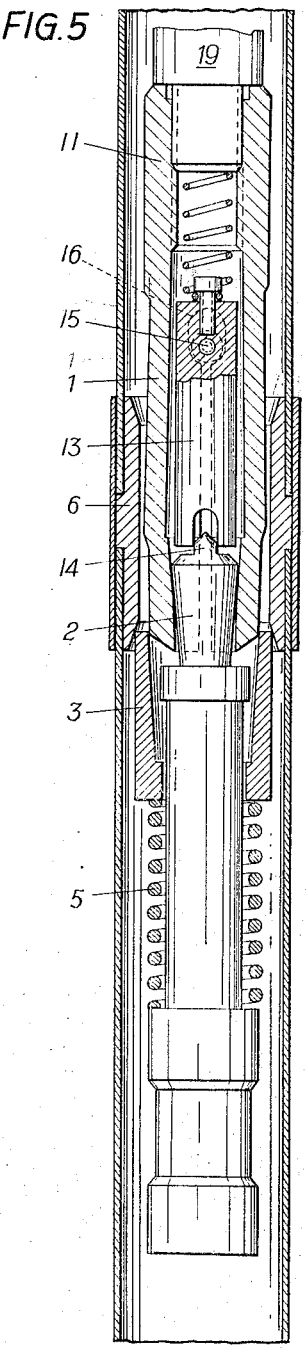
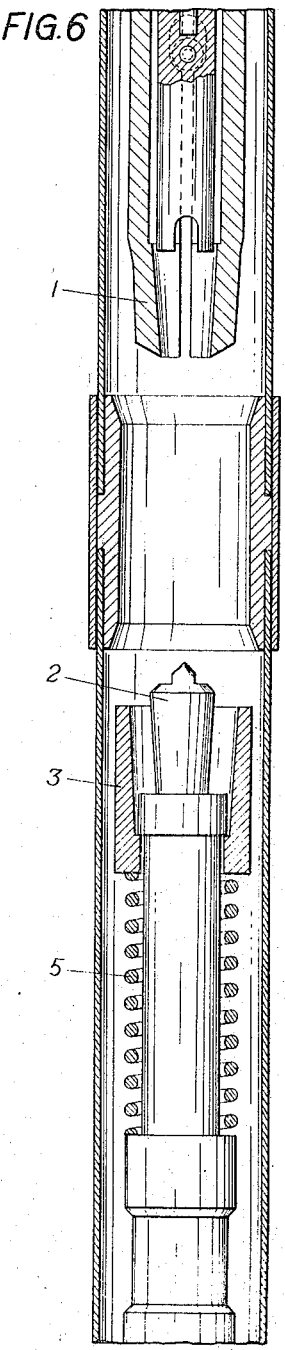

United States Patent Office 3,299,830
Patented Jan. 24, 1967

3,299,830
BAR-COUPLING
Karl Hora, Vienna, Austria, assignor to Firma "Canada" Tiefbohrgerate- und Maschinenfabrik Ing. S. Nadel & A. Nadel, Vienna, Austria, a corporation of Austria
Filed May 7, 1965, Ser. No. 453,953
Claims priority, application Austria, June 8, 1964, A 4,905/64
4 Claims. (Cl. 103—202)

The present invention relates to a bar coupling, in particular for deep well pumps by application of a clamping wedge locking mechanism, in which a conical pin spreads apart slotted resilient parts.

Such couplings are known, however, they have no safety against a rotation of the rod relative to the position. If once the rod together with the piston is turned for any reason for a predetermined angle or for several revolutions, the danger exists in the known structures that only the rod will turn and the piston disposed at the lowermost end will retain its previous position.

It is, therefore, one object of the present invention to provide a bar coupling, which avoids this drawback.

It is another object of the present invention to provide a bar coupling, wherein the coupling is equipped with a safety device for the rotation.

It is still another object of the present invention to provide a bar coupling, wherein the safety device for rotation comprises a bolt disposed inside of slotted resilient parts, which bolt grips with its preferably forked end one or a plurality of projections of a pin and which engages with radial extensions in bores, provided at the end of the slots of a hollow body. In a preferable manner, the extensions are formed by screw heads.

It is yet another object of the present invention to provide a bar coupling, wherein in addition a spring is provided which is supported on the pump rod and the forked end of the bolt presses on an extension of the pin by the force of the spring.

With these and other objects in view, which will become apparent in the following detailed description, the present invention will be clearly understood in connection with the accompanying drawings, in which:

FIGURE 1 is an axial section of the bar coupling designed in accordance with the present invention;

FIG. 2 is a section along the lines 2—2 of FIG. 1;

FIG. 3 is an axial section of the bar coupling indicating the pump rod connected with the piston rod connected with the piston;

FIG. 4 is an axial section of the bar coupling similar to the showing in FIG. 3, however, in its disconnected position;

FIG. 5 is an axial section of the bar coupling indicating the pump rod in its lifted position; and FIG. 6 is an axial section of the bar coupling indicating the latter in its inoperative position.

Referring now to the drawings, the bar coupling comprises a spring body 11 connected with a pump rod 19.

The spring body 11 comprises a spreading sleeve 1 having axially disposed slots 12 which permit a radially spreading movement thereof. The spreading sleeve 1 has a conical inner face 7 at one end thereof, in which a conical pin 2 connected with a pump piston 20 is gripped. The conical pin 2 is tapered down toward its shaft and has a collar 4 below the portion of reduced diameter, which collar 4 is gripped in turn by an axially displaceable clamping sleeve 3. This clamping sleeve 3 is prevented from its upward movement by the collar 4 and is pressed towards the collar 4 by means of an axially operating helical spring 5.

The clamping sleeve 3 grips, in the position shown in FIGS. 1 and 6 of the drawing, with its inner conical face 8 the spreading sleeve 1, so that the latter is rigidly clamped between the pin 2 and the clamping sleeve 3. Since the inner conical face 7 of the spreading sleeve 1 is stronger than the relatively flat conical face 8 of the clamping sleeve 3, the lowered thickened portion of the spreading sleeve 1 cannot be pulled upwardly anymore and, thereby, transmits the pulling forces. Pushing forces can likewise be transmitted, since the spreading sleeve 1 engages the collar 4 at its end face 9.

A bolt 13 disposed inside of the spreading sleeve 1 grips a projection 14 of the pin 2 with its fork-shaped end and engages with lateral extensions 15, which are formed by screw heads, into bores 16 provided at the end of the slots 12. By this arrangement, a safety for joint rotation between the pump rod 19 and the pump piston 20 is brought about. A spring 18 secured to the bolt 13 by means of a screw 17 is supported on the pump rod 19 and presses the fork-shaped end of the bolt 13 onto the projection 14 of the pin 2.

Referring now again to the drawings, and in particular to FIGS. 3 and 4, the pump rod 19 is connected with the piston 20 by means of a spring body 11 and the axially displaceable sleeve 3, the latter two elements operating as movable coupling means in a tube 21. FIG. 4 discloses the same elements in their inoperative or non-coupling position. The spring body 11 is thereby disposed with the pump rod 19 above and the sleeve 3 is disposed below an abutment ring 6 arranged immovably on the tube 21.

In order to obtain the non-coupling position, the pump rod 19 is lifted. As indicated in FIG. 5 of the drawings, the sleeve 3 engages then the abutment ring 6 and remains in this position, while the other coupling elements continue their lifting movement, simultaneously compressing the spring 5, until the spreading sleeve 1 of the spring body 11 emerges from the clamping sleeve 3. FIG. 5 discloses the spreading sleeve 1 shortly prior to this emergence. By the force of the spring 5 and also by the continued movement of the pump rod 9 in upward direction, the conical pin 2 is pulled out of the spreading sleeve 1 and is put into non-coupling position, which is disclosed in FIG. 6 of the drawings.

During the procedure to obtain the non-coupling position, the bolt 13 of the safety means against rotation is pulled off with its fork-shaped end from the projection 14. The bolt 13 is disposed non-rotatably in the spreading sleeve 1. It has three screws 15 equally distributed at its periphery, the heads of the screws 15 entering recesses or bore 16 of the spreading sleeve 1. By this arrangement, the pump body 19 is non-rotatably connected with the pump piston 20 in the coupling positions, so that upon rotation of the pump rod 19, the pump piston 20 joins the rotation.

During the procedure to obtain the coupling position, the pump rod 19 is moved downwardly. The spreading sleeve 1 engages thereby the conical pin 2, spreads apart, engages then the clamping sleeve 3 and pushes the latter downwardly against the force of the spring 5, until it surrounds completely the conical pin 2 and engages the latter tightly. Now, the clamping sleeve 3 can move upwardly under the force of the spring 5, surrounding thereby the spreading sleeve 1 and presses the latter rigidly to the conical pin 2 (FIG. 1).

The function of the coupling can be best demonstrated by means of a coupling and uncoupling process:

If the pump rod 19 should be connected with the pump piston 20 disposed at the bottom of the well, it is lowered through the bore hole with its spring body 11 secured to its lower end. As soon as the spring body 11 reaches the conical pin 2 secured to the pump piston 20, the resiliently widened spreading sleeve 1 slides over its thickened end, until it engages with its end face 9 the end face 10 of the clamping sleeve 3. Now the clamping sleeve 3 is pushed downwardly against the force of the spring 5 until the thickened portion of the spreading sleeve 1 has the possibility to snap into the space provided between the clamping sleeve 3 and the conical pin 2. This snapping in is still enhanced by the conical formation of the end face 9. As soon as this position is reached, the spring 5 pushes the clamping sleeve 3 upwardly again and clamps the spreading sleeve 1 with its slightly conical inner face 8, as indicated above. The fork-shaped end of the bolt 13 enters engagement thereby with the projection 14 of the pin 2.

The resiliency of the spring 5 assures, thereby, a good engagement of all conical faces, so that pulling forces, as well as pushing forces can be transmitted without any play.

If now the coupling should be disconnected, the pump rod 19 is simply pulled upwardly until the end face 10 of the clamping sleeve 3 abuts an abutment ring 6 rigidly secured to the tubing 21 and is pushed, thereby, downwardly against the force of the spring 5.

It releases now the spreading sleeve 1 on the outside, so that it is pulled off by its radial resilient movability due to the pull from above and from the thickened portion of the conical pin 2.

It is clear that the present invention is not limited to the shown embodiment. It is possible, for instance, that upon corresponding seating of the extensions 15 in the bore 16, the spring 18 can be avoided. The safety for rotation can also be brought about by other axially displaceable construction elements, as claws, pins, recesses, and the like.

While I have disclosed one embodiment of the present invention, it is to be understood that this embodiment is given by example only and not in a limiting sense, the scope of the present invention being determined by the objects and the claims.

I claim:

1. A rod-coupling, particularly for deep-well pumps comprising
  a longitudinal hollow body having axially disposed slots for at least part of its length and also a conical inner end face,
  a pump rod connected with said longitudinal hollow body,
  a pump piston,
  a conical pin connected coaxially with said pump piston,
  said conical pin being received in said conical inner end face of said longitudinal hollow body,
  the outer conical face of said conical pin and said conical inner end face of said longitudinal hollow body complementing each other to operate as a clamping wedge locking means, in order to assure the joint rotation of said longitudinal hollow body with said pump piston.

2. The rod-coupling, as set forth in claim 1, which includes
  a bolt disposed in said slotted hollow body and having a fork-shaped end,
  said conical pin has at least one axial projection at its end opposite said bolt,
  said bolt gripping with its fork-shaped end said axial projection of said conical pin,
  said bolt has radial extensions, and
  said longitudinal hollow body has bores at the end of said axially disposed slots and said radial extensions are received in said bores of said longitudinal hollow body.

3. The rod-coupling, as set forth in claim 2, wherein said radial extensions are formed as screw-heads.

4. The rod-coupling, as set forth in claim 2, which includes
  a spring disposed in said longitudinal hollow body and engaging said pump rod to urge said fork-shaped end of said bolt toward said axial projection of said conical pin.

References Cited by the Examiner

UNITED STATES PATENTS 2,675,829   4/1954   Livers _____ 285—322 X

ROBERT M. WALKER, *Primary Examiner.*